United States Patent [19]

Kondo et al.

[11] Patent Number: 4,880,886

[45] Date of Patent: Nov. 14, 1989

[54] PROCESS FOR PRODUCTION OF HIGHLY WATER-ABSORBENT RESIN

[75] Inventors: Susumu Kondo, Kyoto; Tetsuo Moriya, Takatsuki; Hiroshi Aoyama, Hirakata, all of Japan

[73] Assignee: Nippon Gohsei Kagaku Kogyo Kabushiki Kaisha, Osaka, Japan

[21] Appl. No.: 212,375

[22] Filed: Jun. 27, 1988

[30] Foreign Application Priority Data

Jul. 16, 1987 [JP] Japan .................. 62-177769

[51] Int. Cl.$^4$ ............................................. C08F 2/32
[52] U.S. Cl. ...................................... 526/80; 526/81; 526/207
[58] Field of Search ................ 526/80, 81, 206, 207

[56] References Cited

U.S. PATENT DOCUMENTS 4,654,039 3/1987 Brandt ...................... 604/368

FOREIGN PATENT DOCUMENTS 58-32607 2/1983 Japan .

Primary Examiner—Christopher Henderson
Attorney, Agent, or Firm—Armstrong, Nikaido, Marmelstein, Kubovcik & Murray

[57] ABSTRACT

In a process for producing a highly water-absorbent resin comprising subjecting a mixture of (meth)acrylic acid with a water-soluble salt thereof as a monomer to reversed phase suspension polymerization in a hydrophobic solvent in the presence of a dispersing agent, improvements that at least a portion of said monomer is fed sequentially with the progress of polymerization reaction and at least a portion of said dispersing agent is fed sequentially with the progress of polymerization. The resulting resin is useful as a highly water-soluble resin component of sanitary products, or as a humectant/desiccant, a rheology modifier and so on.

5 Claims, No Drawings

PROCESS FOR PRODUCTION OF HIGHLY WATER-ABSORBENT RESIN

BACKGROUND OF THE INVENTION

The present invention relates to improvements in the reversed phase suspension polymerization process for the production of (meth)acrylic acid type highly water-absorbent resins.

While a variety of water-absorbent resins are known today, the (meth)acrylic acid type highly waterabsorbent resins obtainable by subjecting a partially neutralized salt of (meth)acrylic acid to reversed phase suspension polymerization are particularly important.

In regard to the technology of reversed phase suspension polymerization of such a partially neutralized salt of (meth)acrylic acid, a large number of patent applications have been filed to this day as listed below.

Japanese Patent Publication No. 30710/1979 (Laid-open KOKAI 53-46389): a dispersing agent defined.

Japanese Laid-open Patent Application KOKAI 56-26909 (1981): polymerization under reduced pressure.

Japanese Laid-open Patent Application KOKAI 56-93716 (1981): an aliphatic alcohol used concomitantly as a medium.

Japanese Laid-open Patent Application KOKAI 56-131608 (1981): a dispersing agent specified.

Japanese Laid-open Patent Application KOKAI 56-147806 (1981): an aliphatic ketone is used as a medium.

Japanese Laid-open Patent Application KOKAI 56-161408 (1981): certain two kinds of catalysts are used.

Japanese Laid-open Patent Application KOKAI 57-44627 (1982): crosslinking with a crosslinking agent.

Japanese Laid-open Patent Application KOKAI 57-94011 (1982): a carboxy groups-containing polymer is used as a dispersing agent.

Japanese Laid-open Patent Application KOKAI 57-98513 (1982): a basic nitrogen-containing polymer is used as a dispersing agent.

Japanese Laid-open Patent Application KOKAI 57-128709 (1982): a certain anti-tack agent is used.

Japanese Laid-open Patent Application KOKAI 57-158209 (1982): a certain protective colloid is used.

Japanese Laid-open Patent Application KOKAI 57-167302 (1982): a certain nonionic surfactant is used.

Japanese Laid-open Patent Application KOKAI 57-192416 (1982): a certain anti-tack agent is used.

Japanese Laid-open Patent Application KOKAI 57-198714 (1982): partial dehydration of a polymer slurry.

Japanese Laid-open Patent Application KOKAI 58-32607 (1983): addition of a surfactant during or after polymerization.

Japanese Laid-open Patent Application KOKAI 58-42602 (1983) reacting the polymer with a crosslinking agent.

Japanese Laid-open Patent Application KOKAI 58-117222 (1983): reacting with a crosslinking agent.

Japanese Laid-open Patent Application KOKAI 59-8711 (1984) addition of inorganic powders during or after polymerization.

Japanese Laid-open Patent Application KOKAI 59-62665 (1984): crosslinking with a crosslinking agent.

Japanese Laid-open Patent Application KOKAI 60-179410 (1985): a tertiary amino group-containing monomer is concomitantly used.

Japanese Laid-open Patent Application KOKAI 60-186506 (1985): reaction with a crosslinking agent after polymerization.

Japanese Laid-open Patent Application KOKAI 61-40309 (1986): a certain protective colloid is used Japanese Laid-open Patent Application KOKAI 61-43606 (1986): a sucrose fatty acid ester is used as a protective colloid Japanese Laid-open Patent Application KOKAI 61-53308 (1986): certain two kinds of protective colloids are used in combination.

Japanese Laid-open Patent Application KOKAI 61-69812 (1986): reaction with a monoglycidyl compound.

Among the above literature,

Japanese Laid-open Patent Publication KOKAI 57-158209 (1982), ditto KOKAI 58-32607 (1983), ditto KOKAI 60-179410 (1985) and ditto KOKAI 60-186506 (1985) give examples in which the monomer is fed by dripping to a hydrophobic medium.

Among the above literature, Japanese Laid-open Patent Publication KOKAI 58-32607 (1983) describes that the addition of a water-soluble or water-dispersible surfactant during or after polymerization results in an improvement in water absorption characteristics inclusive of initial water absorbency. In this prior art, an oil-soluble cellulose ester or cellulose ether is essentially used as a protective colloid and no surfactant is used as a protective colloid.

It is stated therein that the surfactant is added either "during" or "after" polymerization and that generally the addition thereof to a polymer slurry after polymerization reaction is preferred.

As to why the addition of a surfactant results in an improved water-absorbing characteristic, the inventor concerned postulates that the surfactant breaks the protective colloid covering polymer particles and imparts penetrability to the whole water-absorbent polymer.

As examples of said water-soluble or water-dispersible surfactant, the same patent literature lists nonionic surfactants with HLB values not less than 7, such as polyoxyethylene alkyl ethers, polyoxyethylene alkylphenol ethers, polyoxyethylene sorbitan fatty acid esters, polyoxyethylene fatty acid esters, polyoxy- ethylene-oxypropylene block polymers, etc.; anionic surfactants such as salts of fatty acids, alkylnaphthalenesulfonic acid, dialkyl sulfosuccinates, alkyl sulfate ester salts, higher alcohol sulfate ester salts, etc., and cationic surfactants such as alkylamine salts, alkyl quaternary ammonium salts and so on.

Any highly water-absorbent resin is required to satisfy the following requirements.

(a) It does not undergo uneven gelation on contact with water or body fluid.

(b) When brought into contact with water or body fluid, it shows a high absorption rate and a large absorption capacity.

(c) Even under stress loading, it retains a high absorption rate and a large absorption capacity for water and body fluid.

(d) It shows a high gel strength when swollen on absorption of water or body fluid.

(e) In production, it can be obtained in an appropriate particle size range (100–300 μm) in good yield.

However, the (meth)acrylic acid type highly absorbent resin prepared by the usual reversed phase suspension polymerization process fails to well satisfy the requirements (b) and (e) although it meets the other requirements.

The present inventors also had a preconception, prior to this invention, that once charged in a single dose, a dispersing agent remains at substantially the same concentration level throughout polymerization reaction and accordingly made trials and errors on the supposition that a homogeneous polymer would be forthcoming coming if an ingenuity be excercised in the manner of monomer charging. The outcome was, however, a virtual failure.

Then, the inventors suspected that even if the dispersing agent fed in a single dose may not be destroyed or otherwise eliminated during polymerization, its effective concentration may undergo change in the course of polymerization reaction. The present invention is based on results of research endeavors made along the above way of thinking.

Thus, through an ingenuity exercised in respect to the conditions of reversed phase suspension polymerization, the present invention has successfully made it possible to produce a (meth)acrylic acid type highly water-absorbent resin meeting all the aforementioned requirements (a) though (e).

SUMMARY OF THE INVENTION

The present invention is concerned with a method of producing a (meth)acrylic acid type highly waterabsorbing resin which comprises subjecting a monomer comprising a mixture of (meth)acrylic acid with a water-soluble salt of (meth)acrylic acid to reversed phased suspension polymerization in a hydrophobic medium by feeding at least a portion of the monomer sequentially according to the progress of polymerization and feeding at least a portion of a dispersing agent sequentially according to the progress of polymerization reaction.

DETAILED DESCRIPTION OF THE INVENTION

The present invention is carried into practice using as a monomer a mixture of (meth)acrylic acid with a water-soluble salt of (meth)acrylic acid. The watersoluble salt may be the corresponding sodium salt, potassium salt, ammonium salt or the like.

The proportions of (meth)acrylic acid and said water-soluble salt of (meth)acrylic acid in said mixture are preferably selected from the range of 10/90 through 50/50 in molar ratio. Outside this range, the water absorption characteristic of the resulting resin will not be as satisfactory as desired.

The mixture of (meth)acrylic acid with a water-soluble salt thereof can be generally obtained by partial neutralization of (meth)acrylic acid with an alkali such as sodium hydroxide, potassium hydroxide, ammonia or the like.

The above monomer may be used in combination with small proportions of other vinyl monomers such as (meth)acrylic esters, unsaturated sulfonic acids or salts thereof, (meth)acrylamide, (meth)acrylonitrile, vinyl esters, vinyl ethers and so on.

As the hydrophobic medium, there may be employed $C_{6-10}$ hydrocarbons and halogenated aromatic hydrocarbons such as hexane, heptane, octane, cyclopentane, methylcyclopentane, cyclohexane, methylcyclohexane, cyclooctane, decalin, benzene, toluene, xylene, chlorobenzene, dichlorobenzene, ethylbenzene and so on. In consideration of boiling point and commercial availability, cyclohexane and n-hexane are particularly preferred.

As the dispersing agent, any dispersing agent capable of dispersing an aqueous solution of the monomer into said hydrophobic medium can be employed, irrespective of whether it is a surfactant or a polymeric dispersing agent. However, nonionic surfactants with HLB values in the range of 3 to 12 and particularly those sorbitan fatty acid esters and sucrose fatty acid esters which have HLB values in the range of 3 to 12 are most suitable for the purposes of the invention.

The polymerization reaction is carried out by dispersing an aqueous solution of the monomer in a hydrophobic medium with the aid of a dispersing agent.

This is in contrast with the usual suspension polymerization which is conducted by dispersing the very monomer in an aqueous medium and is therefore called reversed phase suspension polymerization.

The polymerization catalyst is added to the aqueous monomer solution. The use of a chain transfer agent is not required but if used, it is added to the aqueous monomer solution.

The preferred polymerization temperature is in the range of about 50° C. to the reflux temperature of the reaction system.

In the practice of the invention, at least a portion of the monomer is fed sequentially according to the progress of polymerization reaction and at the same time, at least a portion of the dispersing agent is also fed sequentially according to the progress of reaction. That is to say, there is no initial charge of the monomer or the dispersing agent or their initial charge is limited to a given quantity and the remainder is fed in small portions (especially dropwise). Such additional feeds of the monomer and dispersing agent may be simultaneous or independent.

The preferred process parameter settings are as follows.

$Mi/Ma = 0/100 - 50/50$ $Di/Da = 0/100 - 60/40$ $D/M = 1/100 - 6/100$ $Di/S = 0/100 - 0.30/100$ where M is the total monomer charge, Mi is the initial monomer charge, Ma is the additional monomer charge, D is the total charge of the dispersing agent, Di is the initial charge of the dispersing agent, Da is the additional charge of the dispersing agent, S is the charge of the hydrophobic medium (all by weight; the subscripts i and a stand for initial and additional, respectively). It is especially desirable to set Mi/Ma in the range of 0/100 to 20/80 and Di/Da in the range of 0/100 to 40/60. It is more desirable to set Mi/Ma in the range of 0/100 to 10/90 and Di/Da in the range of 1/99 to 30/70.

During or after polymerization, there may be added, as required, various additives such as a crosslinking agent, an inorganic particulate substance and so on.

The highly water-absorbent resin obtainable by the process of this invention finds application as, for example, a body fluid absorbent in sanitary products, a soil improving agent, a seed coating agent, a water sealant, a thickner or rheology modifier, anti-condensation agent, a sludge flocking agent, a desiccant, a humectant or the like.

Since, in accordance with the invention, at least a portion of the monomer is sequentially fed to the reaction system according to the progress of polymerization reaction, the monomer charge is kept in balance with the polymer production so that the concentration of the unpolymerized monomer in the hydrophobic medium is maintained in a definite range.

In addition, because at least a portion of the dispersing agent is sequentially fed to the system according to the progress of polymerization reaction, the effective concentration of the dispersing agent in the hydrophobic medium is also maintained in a definite range.

The reason why the effective concentration of the dispersing agent fed initially varies in the course of polymerization is not clear but it is suspected that the dispersing agent loses its monomer-dispersing power with the progress of polymerization reaction or is adsorbed on the polymer formed to undergo attrition of its functionality as a dispersing agent. Thus, although it is not conceivable that the added dispersing agent as such is destroyed or lost, it appears that its monomer-dispersing ability is gradually lost with the progress of polymerization to cause a decrease in the "effective concentration of the dispersing agent".

Since, in accordance with the invention, both the concentration of the monomer and the effective concentration of the dispersing agent in the hydrophobic medium are each maintained in a definite range, the environment surrounding the suspended monomer during polymerization is kept constant, thus assuring the formation of a highly water-absorbent polymer meeting all the aforesaid requirements (a) through (e), which are reiterated here as follows.

(a) It does not undergo uneven gelation on contact with water or body fluid.

(b) When brought into contact with water or body fluid, it shows a high absorption rate and a large absorption capacity (c) Even under stress loading, it retains a high absorption rate and a large absorption capacity for water and body fluid.

(d) It shows a high gel strength when swollen on absorption of water or body fluid.

(e) In production, it can be obtained in an appropriate particle size range (100–300 μm) in good yield.

EXAMPLES p The following examples are further illustrative of the invention. In these examples, all parts and % are by weight.

EXAMPLE 1

A highly water-absorbent resin was prepared by the following procedure.

1. A two-liter round-bottomed separable flask (A) fitted with a stirrer, reflux condenser and nitrogen gas inlet line was charged with 1000 ml (780 g) of cyclohexane as a hydrophobic medium and 0.2 g of sorbitan monostearate (HLB=4.7) as a dispersing agent. Then, nitrogen gas was bubbled into the mixture for 30 minutes to drive out the dissolved air and plenum air and the mixture was maintained at 70° C.

2. Another separable flask (B) was charged with 140 g of acrylic acid (reagent special grade) and, then, a solution of 62 g of sodium hydroxide (purity 95%) in 185 g of water was gradually added dropwise thereto under stirring and cooling for neutralization. Then, nitrogen gas was bubbled into the mixture under stirring to drive out the dissolved air. Thereafter, 4.2 ml of a 2% aqueous solution of ammonium persulfate and 1.4 ml of a 1% aqueous solution of N,N'-methylenebisacrylamide, which had been stripped with nitrogen gas, were added into the flask and the mixture was stirred thoroughly. The mixture was then transferred to a drip funnel (C) which had been purged with nitrogen gas.

3. A drip funnel (D) was charged with a solution of 4 g of sorbitan monostearate in 100 ml (78 g) of cyclohexane, and nitrogen gas was bubbled into the solution.

4. While the mixture in flask (A) was maintained at 0° C. with stirring, the solution in drip funnel (C) was added, by dripping, to flask (A) over a period of 60 minutes. At the same time, the solution in drip funnel (D) was also dripped into the flask (A) over 60 minutes. After completion of dropwise addition, the reaction was further conducted at 70°–75° C. for 60 minutes, with the byproduct water being distilled off azeotropically with cyclohexane.

5. After completion of the reaction, the reaction system was cooled and the product polymer was recovered by filtration through a 325-mesh wire filter, washed with warm cyclohexane and dried in vacuo at 80° C.

The parameter settings used in the above operation were as follows.
Mi/Ma: 0/100
Di/Da: 4.8/95.2
D/M: 3/100
Di/S: 0.0233/100

EXAMPLE 2

Reversed phase suspension polymerization was conducted in the same manner as Example 1 except that the initial to additional charge ratio Di/Da of sorbitan monostearate (HLB=4.7) was adjusted to 20/80. The parameter settings were as follows.
Mi/Ma: 0/100
Di/Da: 20/80
D/M: 3/100
Di/S: 0.098/100

EXAMPLE

Reversed phase suspension polymerization was conducted in the same manner as Example 1 except that sorbitan monolaurate with an HLB value of 8.6 was used as the dispersing agent and that the following parameter settings were used.
Mi/Ma: 0/100
Di/Da: 10/90
D/M: 5/100
Di/S: 0.1/100

EXAMPLE 4

Reversed phase suspension polymerization was conducted in the same manner as Example 1 except that sucrose stearic acid ester with an HLB value of 3.6 was used as the dispersing agent and that the following parameter settings were used.
Mi/Ma: 10/90
Di/Da: 30/70
D/M: 4/100
Di/S: 0.196/100

EXAMPLE 5

Reversed phase suspension polymerization was conducted in the same manner as Example 1 except that sucrose stearic acid ester with an HLB value of 3.6 was used as the dispersing agent and that the following parameter settings were used.
Mi/Ma: 0/100
Di/Da: 20/80
D/M 4/100
Di/S: 0.13/100

Reference Example 1

Reversed phase suspension polymerization was conducted in the same manner as Example 1 except that the initial to additional charge ratio of the monomer was changed to Mi/Ma=30/70 and that the initial to additional charge ratio of sorbitan monostearate (HLB=4.7) as the dispersing agent was changed to Di/Da=30/70. The parameter settings were as follows.
Mi/Ma: 30/70
Di/Da: 30/70
D/M: 3/100
Di/S: 0.147/100

Comparative Example 1

In this comparative example, the whole amount of the aqueous monomer solution and of the dispersing agent were fed both in a single dose at commencement of polymerization reaction.

A highly water-absorbent resin was prepared by the following procedure.

1. The step 1 of Example 1 was repeated except that flask (A) was charged with 1100 ml (858 g) of cyclohexane and 4.2 g of sorbitan monostearate (HLB=4.7) as the dispersing agent.
2. The step 2 of Example 1 was repeated except that the transfer from flask (B) to drip funnel (C) was omitted. Then, flask (B) was heated at an internal temperature of 70° C.
3. The step 3 of Example 1 was omitted.
4. While the mixture in flask (A) was maintained at 70° C. with constant stirring, the solution in flask (B) was transferred to flask (A) using care to avoid exposure of the solution to atmospheric air. After the transfer, the reaction was carried out at 70°-75° C. for 2 hours, with the byproduct water being distilled off azeotropically with cyclohexane.
5. The step 5 of Example 1 was repeated.

The parameter settings in the above operation were as follows.
Mi/Ma: 100/0
Di/Da: 100/0
D/M: 3/100
Di/S: 0.49/100

Comparative Example 2

In this comparative example, the polymerization reaction was conducted in the same manner as Example 1 except that the whole amount of the dispersing agent was fed in a single dose at commencement of the reaction.

A highly water-absorbent resin was prepared by the following procedure.

1. The step 1 of Example 1 was repeated except that flask (A) was charged with 1100 ml (858 g) of cyclohexane and 4.2 g of sorbitan monostearate (HLB=4.7) as the dispersing agent.
2. The step 2 of Example 1 was repeated.
3. The step 3 of Example 1 was omitted.
4. While the mixture in flask (A) was maintained at 70° C. with constant stirring, the solution in drip funnel (C) was transferred dropwise to flask (A) over a period of 60 minutes. After completion of dropwise addition, the reaction was further conducted at 70°-75° C. for 60 minutes, with the byproduct water being distilled off azeotropically with cyclohexane.
5. The step 5 of Example 1 was repeated.

The parameter settings in the above operation were as follows.
Mi/Ma: 0/100
Di/Da: 100/0
D/M: 3/100
Di/S: 0.49/100

The particle sizes and various properties of the polymers prepared in Examples 1 to 5, Reference Example 1 and Comparative Examples 1 and 2 above are set forth in Table 1.

TABLE 1

| | Absorption capacity (times) | | Ion exchanged water | | Swelling speed under load (times/5 min.) | Gel strength | Average particle size of polymer (μm) | Percentage of particles ≦74 (wt. %) |
|---|---|---|---|---|---|---|---|---|
| | Ion exchanged water | Physiological saline | Swelling time (sec) | Incidence of uneven gelation | | | | |
| Example 1 | 350 | 60 | 120 | None | 45 | ◎ | 180 | 3 |
| Example 2 | 300 | 55 | 300 | None | 35 | ○ | 150 | 8 |
| Example 3 | 350 | 60 | 120 | None | 45 | ○ | 130 | 4 |
| Example 4 | 300 | 58 | 180 | None | 40 | ○ | 150 | 7 |
| Example 5 | 300 | 58 | 160 | None | 40 | ○ | 180 | 5 |
| Ref. Example 1 | 300 | 50 | ≧600 | Occurred | 15 | △ | 100 | 15 |
| Comp. Example 1 | 300 | 50 | ≧600 | Occurred | 15 | △ | 70 | 20 |
| Comp. Example 2 | 300 | 50 | ≧600 | Occurred | 15 | △ | 80 | 18 |

The conditions of determinations were as follows.

Absorption capacity for ion exchanged water or physiological saline

A 500-ml beaker was charged with 0.2 g (on a dry basis) of each particulate polymer, followed by addition of 200 g of ion exchanged water or 60 g of physiological saline (0.9% aqueous sodium chloride solution). The mixture was gently stirred with a glass rod and, then, allowed to stand at room temperature for 1 hour. The mixture was then filtered through a 325-mesh wire filter and the residual gel was weighed. The absorption capacity was calculated by means of the following equation.

Absorption capacity =(weight of filtration residue gel (g) −0.2)/0.2

Ion exchanged water absorption rate and incidence of uneven gelation

In a 100-ml measuring cylinder containing 100 ml of ion exchanged water was put 0.5 g (on a dry basis) of the test particulate polymer to cause swelling of the polymer particles and the incidence of uneven gelation was investigated by visual inspection. In addition, a stopwatch was started at addition of the particulate polymer and the time to complete coverage with gel was measured and regarded as swelling time.

Swelling speed under load

There was provided a funnel constructed so that its top is configured as a cylinder with an inside diameter of 30 mm and its bottom configured as a cone with a shank consisting in a small-diameter tube extending downwardly from the center of the conicalcylindrical portion.

A glass filter (G-2) was installed at the depth of 25 mm from the top end of the funnel and 0.5 g of the test particulate polymer was uniformly placed on the glass filter. Then, a weight having a diameter substantially equal to the inner diameter of the cylindrical portion of the funnel was put on the particulate polymer so that the polymer particles would be subjected to a load of 15 g/cm$^2$.

The bottom end of a buret containing physiological saline (0.9% aqueous solution of NaCl) was connected to the lower end of the aforementioned shank of the funnel with a polyvinyl chloride tube and the cock of the buret was opened. The weight of the liquid in the buret was previously adjusted so that the top surface of the glass filter would be wetted with physiological saline. The amount of liquid in the buret was kept constant by adding physiological saline continuously.

After 5 minutes, the swollen gel was taken out and weighed and the amount of physiological saline absorbed in 5 minutes was determined in the unit of times the dead weight of the polymer.

Gel strength

A 0.5 g portion of the filtration residue gel obtained in the determination of physiological saline absorption capacity was taken on the palm and rubbed against by the palms of both hands to assess the gel strength organoleptically.

What is claimed is:

1. In a process for producing a highly waterabsorbent resin comprising subjecting a mixture of (meth)acrylic acid with a water-soluble salt thereof as a monomer to reversed phase suspension polymerization in a hydrophobic solvent in the presence of a dispersing agent, the improvement wherein at least a portion of said monomer is fed sequentially with the progress of the polymerization reaction and at least a portion of said dispersing agent is fed sequentially with the progress of polymerization, and wherein the polymerization reaction is conducted under the following parameter settings:

Mi/Ma=0/100 to 20/80
Di/Da=0/100 to 40/60
D/M=1/100 to 6/100
Di/S=0/100 to 0.03/100 wherein M represents the total charge of monomer, Mi represents the initial charge of the monomer, Ma represents the additional charge of the monomer, D represents the total charge of the dispersing agent, Di represents the initial charge of the dispersing agent, Da represents the additional charge of the dispersing agent, and S represents the charge of the hydrophobic medium, all proportions being by weight.

2. The improved process of claim 1 wherein Mi/Ma is 0/100 to 10/90 and Di/Da is 1/99 to 30/70.

3. The improved process of claim 1 wherein the additional charges of the monomer and dispersing agent are fed dropwise.

4. The improved process of claim 1 wherein the dispersing agent is a nonionic surfactant with an HLB value between 3 and 12.

5. The improved process of claim 6 wherein said nonionic surfactant with an HLB value between 3 and 12 is a sorbitan fatty acid ester or a sucrose fatty acid ester.

* * * * *